United States Patent Office 3,423,230
Patented Jan. 21, 1969

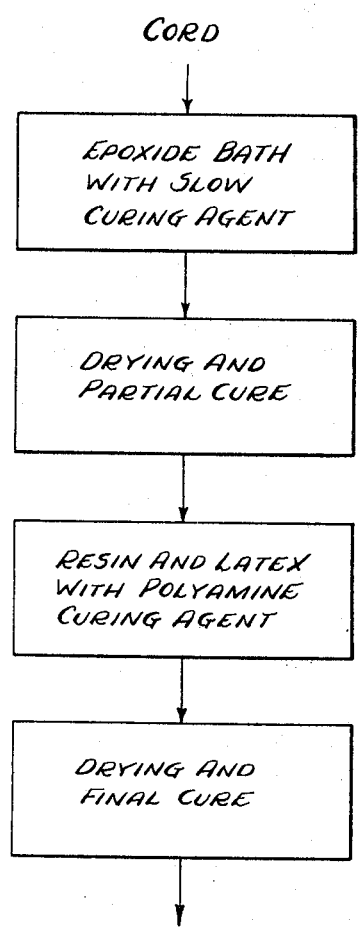

3,423,230
PREPARATION OF TIRECORD, ETC., BY TWO-STEP TREATMENT USING A CURABLE EPOXY ADHESIVE AND LATEX
Louis W. Georges, Akron, Ohio, assignor to The Firestone Tire & Rubber Company, Akron, Ohio, a corporation of Ohio
Original application May 4, 1962, Ser. No. 192,311. Divided and this application June 7, 1965, Ser. No. 467,176
U.S. Cl. 117—62.2     5 Claims
Int. Cl. B29h 9/04; B32b 25/10

ABSTRACT OF THE DISCLOSURE

Tirecords, etc. are prepared by a two-step treatment, using an epoxy adhesive and latex, with a slower curing agent in the first step which only partially cures the adhesive during the drying which follows the first step, and using a faster curing agent in the second step.

---

This application is a division of my application Ser. No. 192,311 filed May 4, 1962 (now abandoned).

This invention relates to a method of treating rubber-reinforcing cords of nylon, polyester, etc. The treated cord may be used as tirecord, but is also useful in belts, etc.

It is known to treat tirecord, etc. with an epoxy resin (with or without a curing agent), a phenol-aldehyde resin (preferably resorcinol-formaldehyde resin) and latex of a rubber (which may be natural rubber or a synthetic containing at least 50 percent butadiene, and preferably a copolymer which includes vinyl pyridine).

The treatment of such cords has been diligently studied and considerable has been published on the subject. Mighton U.S. Re. 23,451 describes treatment with phenol-aldehyde adhesives, and this was standard treatment for many years. More recently, Schroeder 2,902,398 described a two-step treatment, in which a cord was first dippd in a bath of epoxide resin and a curing agent, and then, after drying, the treated cord was dipped into a second bath which contained latex of a rubbery butadiene and vinyl-pyridine copolymer and a phenol-aldehyde condensation product.

The treatment of this invention is an improved two-step or two-dip process, which gives a stronger flexible bond, usually with the use of less adhesive, being therefore less expensive. An important feature of the invention is the use of a relatively slow curing agent for the epoxy resin in the first dip with subsequent partial curing, and a faster curing agent for the epoxy resin in the second dip, after which the cure is completed. A preferred curing agent to be used in the first dip is zinc fluoborate. Curing agents used in the second dip are polyamines, and a preferred curing agent for use in the second dip is m-phenylenediamine. The first dip may include a rubber latex, such as the latex of natural rubber, polyisobutylene, SBR, BR, IR, IIR, EPR, etc. which is not chemically reactive with the cord.

The invention is not limited with respect to the size or structure of the cord that is to be treated. It may be a fabric-reinforcing cord of any suitable size and construction. The invention has been used with both nylon and polyetser cords, typical constructions being 1100/2, 840/2, 1100-3/2 and 840-2/3, but the invention is not limited thereto. The film deposited on the cord in the first dip is relatively light, being deposited from a relatively dilute composition; and the film deposited in the second dip is relatively thick, being deposited from a relatively concentrated solution. The total increase in weight in the dried treated cord due to the adhesive treatment may be as little as 2 to 15 percent, preferably 5 to 9 percent, of the weight of the cord. The two-ply deposit after drying forms a strong bond with the cord, and also a strong bond with rubber which is subsequently vulcanized to it in any suitable manner. This rubber may be natural rubber, neoprene or a synthetic polymer of a diene containing 4 to 5 carbon atoms such a polybutadiene, polyisoprene, or a copolymer of the two, or a copolymer of such a diene with styrene, etc.

The epoxy resin is applied in a water solution or dispersion, and may be any of the adhesive epoxy resins known to be thus applicable in an aqueous medium. It has an epoxy equivalency greater than 0.20 per 100 grams as determined by standard analysis. The molecular weight is preferably less than 900. As illustrative of epoxy resins suitable for the purpose, we refer to the disclosure of such resins in Schroeder 2,902,398 which is incorporated herein, by reference, as a part of this disclosure.

The slower curing agents suitable for use in the first dip include, for example, alkalies such as sodium and potassium hydroxides; alkali phenoxides such as sodium phenoxide; carboxylic acids and anhydrides such as formic acid, oxalic acid and phthalic anhydride; salts such as zinc fluoborate, magnesium perchlorate and zinc fluosilicate; and phosphoric acid and partial esters thereof including n-butyl o-phosphate, diethyl o-phosphate and hexethyl tetraphosphate. The linear polymers obtained by condensation of dimeric fatty acids with polyamines (known as Versamids) can be used. Also, monoamines and polyamides can be used in the first dip.

The faster curing agents suitable for use in the second step are polyamines such as diethylene triamine, triethylene tetramine, N-N-dibutyl-1,3-propane diamine, 1,2-diamino-2-methylpropane, 2,3-diamino-2-methylbutane, 2,4-diamino-2-methylpentane, 2,6-diamino-2,6-dimethyloctane, diaminopyridine, tetraethylene pentamine, meta-phenylenediamine, p,p'-dianilino-methane and p-phenylenediamine.

In the first step, the amount of curing agent may be as little as 5 percent of the weight of the epoxy resin and may be as much as 15 or more percent up to 50 percent of the weight of the resin, although the latter amount is apt to make the cords stiffer than desired. The weight of the epoxy resin may be 2 to 6 parts, by weight, per 100 parts of water used.

It has been found that by adding to the epoxy resin a small amount of an alcohol such as methyl alcohol, ethyl alcohol, or isopropanol, etc., e.g. 0.5 to 5 parts per 100 parts of the aqueous medium of the first step, the viscosity of the resin is reduced and its handling thereby facilitated.

The bath used in the first dip is an aqeuous bath, either a water solution or a water dispersion. By the use of mechanical agitating means the use of an emulsifying agent may be avoided, although this is optional. Non-ionic emulsifying agents such as those known as Triton X100, etc. can be used satisfactorily, as can cationic emulsifying agents.

After the first dip the cord is dried at a temperature at which the curing agent is active, and there is substantial but an incomplete cure of the epoxy resin. The cure is continued after the more active curing agent used in the second dip is applied, and the cord is again heated.

The ingredients used in the treatment of the cords in the second step of the process, include the phenol-aldehyde resin (preferably a resorcinol-formaldehyde condensation product), the rubber latex and the curing agent.

The resorcinol-formaldehyde (or other phenol-aldehyde) resin is made by alkaline catalysis, as by reacting 0.5 to 1.0 mole of resorcinol with 2.5 to 3.5 moles of formaldehyde. Such condensation products are known for this use, and other phenolaldehyde resins which may be used are disclosed in Schroeder 2,902,398.

The rubber latex which is preferred is a copolymer of butadiene and a vinyl pyridine (such as 2-vinyl pyridine or 4-vinyl pyridine) or methyl homologues thereof. It may be a terpolymer which includes, for example, styrene. The copolymer latex may be mixed with other rubber latex, such as polybutadiene or SBR latex or other aqueous rubber dispersion.

The treating bath for the second step of the process includes 1 part of resorcinol-formaldehyde (dry basis) to 3–7 parts of latex (dry weight), and preferably about 1 part of the former to 5 parts of the latter. Curing agent for the epoxy resin is added to complete the cure of the epoxy resin applied to the cord in the first treating step. The total amount of curing agent used will depend upon the nature of the curing agent employed. In general it will total at least about 5 percent of the weight of the resin and may be several times that figure.

In carrying out the invention, the film from the first dip is dried before the second dip is applied. During drying there is substantial but only partial cure of the epoxy resin. Then, after the second dip, the film deposit is again dried and the cure is completed. In each drying step, a low initial heat is used to prevent the deposit from boiling, and this may be raised after sufficient water has been eliminated. For instance, each drying step may start at a temperature of 350° F., with eventual heating at about 450° F. or higher, and the drying time will be determined accordingly, at from about 2 to 3 or 4 minutes or more.

For comparison, two two-dip treatments were carried out on Dacron tirecord. The same procedure, using the same epoxy resin, was used in each first dip. A condensation product of a dimer fatty acid and a polyamine was used. In the second dip, the procedures were identical except that in one procedure m-phenylene diamine was used as a curing agent and in the other procedure no curing agent was used (following the general procedure disclosed in the Schroeder patent). Two samples were prepared by each treatment. These were cured at about 300° F. for 30 minutes. H-specimens, obtained from such test pads, were subjected to a pull at 230° F. on a Scott tester in order to evaluate the hot adhesion by the "H" test method described in Study of the "H" Test for Evaluating the Adhesive Properties of Tire Cord in Natural and GR–S Rubbers in India Rubber World, 114, 1946, pages 213–217. The results, recorded in pounds per inch, follow.

No curing agent in second dip: 56, 59
Curing agent in second dip: 67, 72

The usual apparatus for dipping cords will be employed, but two dipping and drying operations will be required. The steps of the process are illustrated by a flow sheet in the accompanying drawing.

The polyesters to which the process is applicable are the commercial polyesters suited for use as tirecords and include cords composed of the polyethylene terephthalate described in U.S. 2,465,319. The nylons are linear condensation polymers containing recurring carbon-amide groups as an integral part of the polymer chain such as, for example, those made in accordance with U.S. 2,071,250, 2,071,253, 2,130,948 and 2,241,321.

Cords treated according to the improved procedure of this invention are designed to be incorporated into a composite rubber article involving vulcanization of the rubber. The actual vulcanization is a conventional step and any procedure known in the art can be used. The cure of the epoxy resin can be completed during said vulcanization of the rubber.

What I claim is:

1. The process of treating cords of the class consisting of nylon and polyester cords for use in textile-reinforced rubber products, which comprises treating the cord in a first dip in an aqueous medium which includes (1) an epoxy adhesive resin having an epoxy equivalency greater than 0.20 per 100 grams of the resin, and (2) a curing agent for this resin; heating the treated cord and thereby drying the same and partially curing the epoxy resin, the cure being only partial but substantial; and then treating the cord in a second dip in an aqueous medium containing (1) a polyamine curing agent for the epoxy resin, (2) one part (dry weight) of a phenol-aldehyde resin and (3) 3 to 7 parts (dry weight) of a rubber latex; the curing agent in the first dip being slower acting than said polyamine curing agent; the solids of the latex being a rubbery polymer containing butadiene-1,3 and a vinyl pyridine; and heating the treated cord after the second dip to dry the cord and continue the cure.

2. The process of claim 1 in which a condensation product of a dimer fatty acid and a polyamine is used as curing agent in the first dip.

3. The process of claim 1 in which the first dip includes a rubber latex.

4. The process of claim 1 in which the second dip includes m-phenylenediamine as curing agent.

5. The process of claim 1 in which the second dip includes triethylenetetramine as curing agent.

References Cited

UNITED STATES PATENTS

| 2,902,398 | 9/1959 | Schroeder | 117—161 |
| 3,083,118 | 3/1963 | Bridgeford | 117—62.2 X |
| 3,135,625 | 6/1964 | Ingrassia | 117—62.2 |
| 3,308,007 | 3/1967 | Shepard | 117—76 X |

FOREIGN PATENTS

| 1,189,893 | 3/1959 | France. |

WILLIAM D. MARTIN, Primary Examiner.

R. HUSACK, Assistant Examiner.

U.S. Cl. X.R.

117—161, 138.8, 76; 156—110, 330